UNITED STATES PATENT OFFICE.

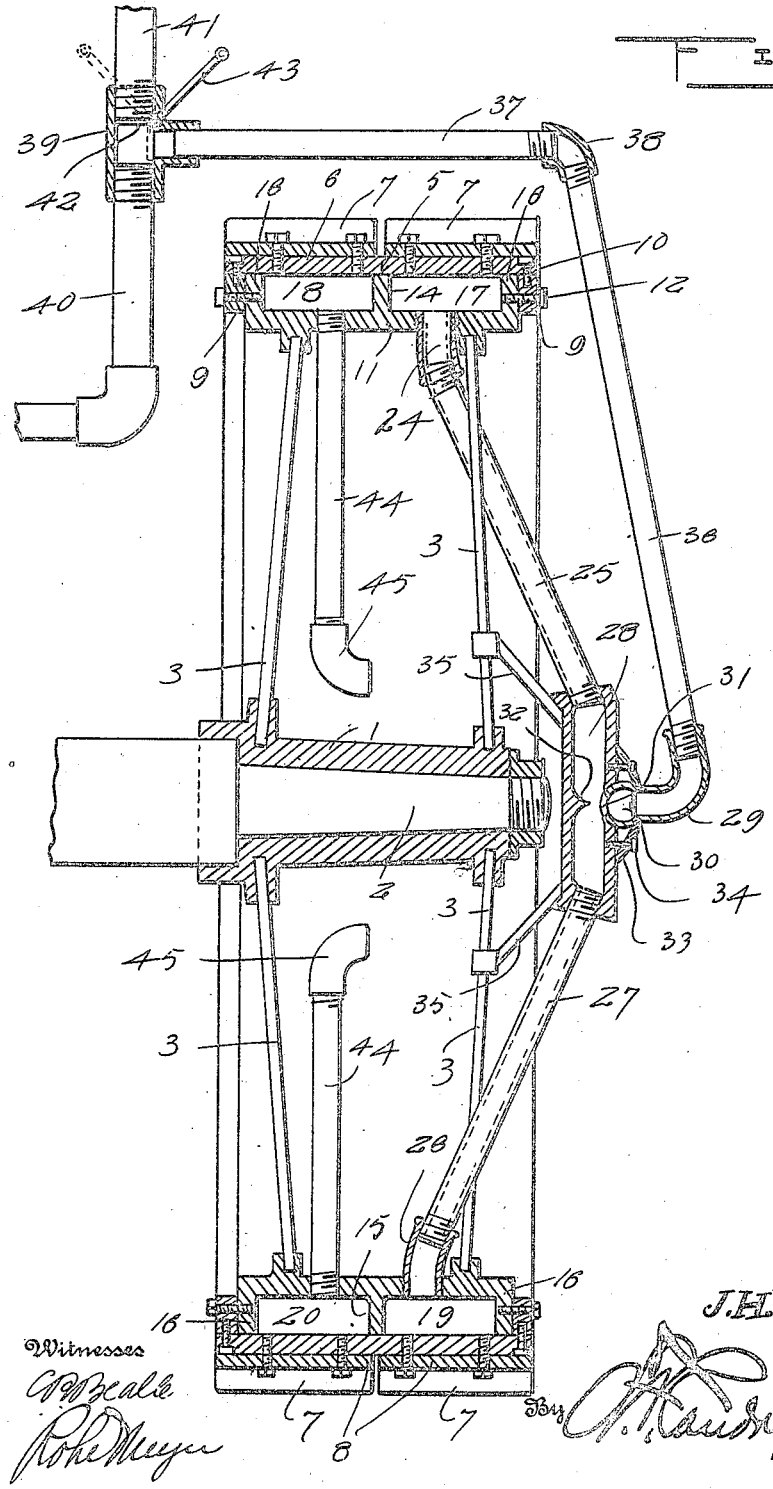

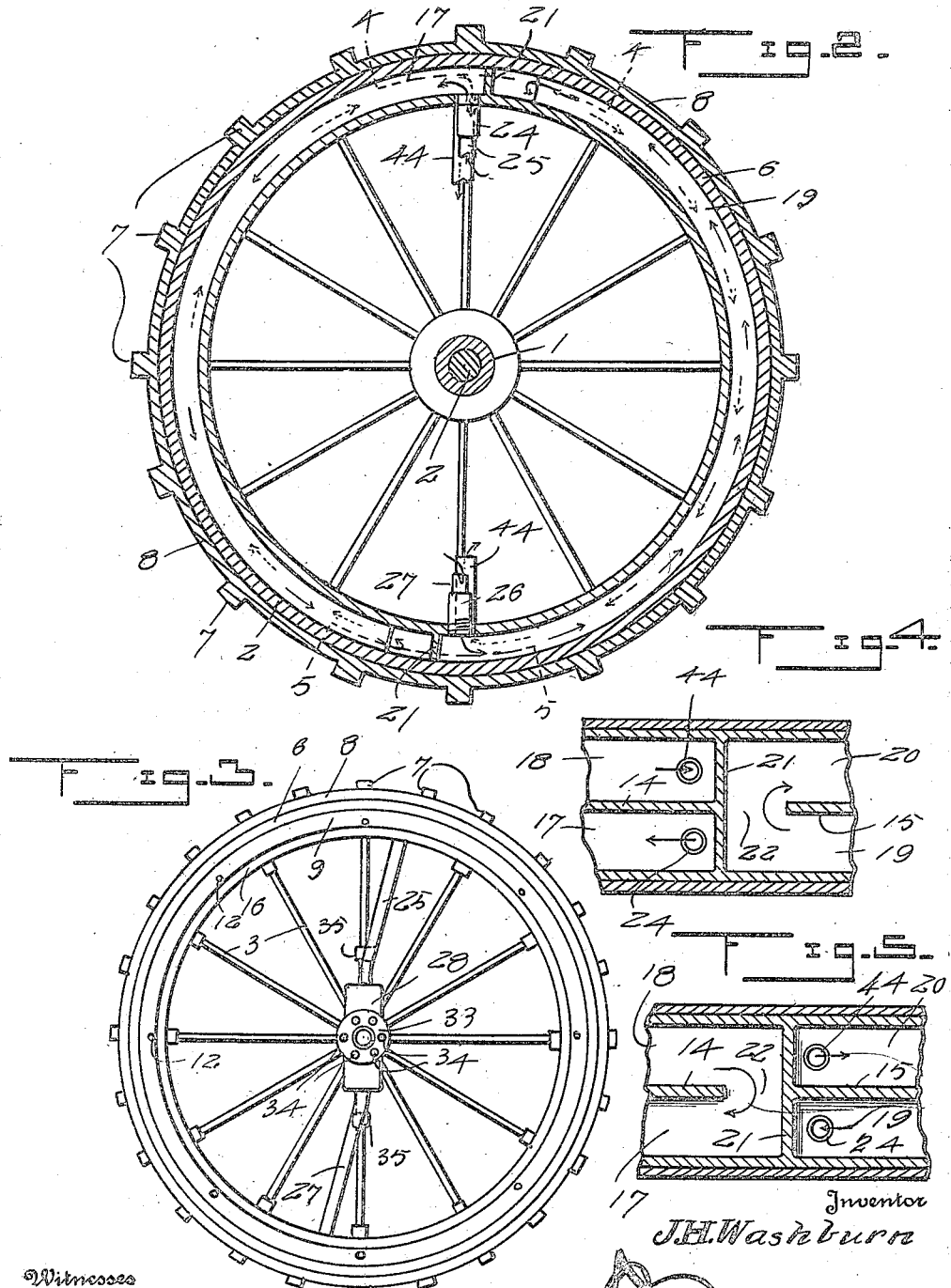

JOHN H. WASHBURN, OF DURKEE, OREGON.

TRACTION-WHEEL.

1,288,772.  Specification of Letters Patent. Patented Dec. 24, 1918.

Application filed March 12, 1918. Serial No. 222,012.

*To all whom it may concern:*

Be it known that I, JOHN H. WASHBURN, a citizen of the United States, residing at Durkee, in the county of Baker and State of Oregon, have invented certain new and useful Improvements in Traction-Wheels; and I do hereby declare the following to be a full, clear, and exact description of the invention, such as will enable others skilled in the art to which it appertains to make and use the same.

This invention relates to traction wheels, such as are commonly employed upon tractors and the primary object of the invention is to provide a traction wheel which has semi-annular recesses formed in the rim thereof through which the exhaust gases from the engine of the tractor, or any other suitable heating medium is circulated for heating the tread of the wheel to prevent the accumulation of mud or soft soil upon the wheel, as well as to prevent the accumulation of ice or snow, in case the tractor is used over such surfaces.

With the foregoing and other objects in view this invention consists in such novel features of construction combination and arrangement of parts as will be hereinafter more fully described illustrated in the accompanying drawings and claimed.

In describing the invention in detail reference will be had to the accompanying drawings wherein like characters designate like and corresponding parts throughout the several views and in which:

Figure 1 is a section through the improved wheel.

Fig. 2 is a section through the wheel taken transversely to the section illustrated in Fig. 1.

Fig. 3 is a side elevation of the wheel.

Fig. 4 is a fragmentary section on the line 4—4 of Fig. 2, and

Fig. 5 is a fragmentary section on the line 5—5 of Fig. 3.

Referring more particularly to the drawings, 1 designates the hub of the tractor wheel which is mounted upon the usual type of axle spindle 2. The usual or ordinary type of spokes 3 are employed in the wheel construction and they are connected to the hub and the inner-most surface of the rim structure, as is ordinary.

The rim structure, which is generically indicated by the numeral 5, includes an outer rim or plate 6 to which the traction cleats or grouters 7 are attached. The cleats or grouters 7 are preferably formed upon metal bands 8, which extend circumferentially about the outer rim 6. Annular rings 9 are attached to the inner surface of the outer rim section 6 by bolts as shown at 10 and these rings which are positioned at the edges of the wheel are secured to the inner rim section 11 by bolts 12. The inner rim section 11 is provided with two semi-annular ribs 14 and 15 which in connection with the angled end 16 of the rim section 11 form four chambers 17, 18, 19 and 20 which are arranged in pairs extending about substantially one half of the circumference of the wheel as clearly shown in Fig. 2 of the drawings. The spaces or passage ways 17 and 19 and the spaces or passage ways 18 and 20 are separated by radial partitions 21.

The partitions or ribs 14 and 15 terminate short of the transverse partitions 21 at one of their ends, providing spaces 22 which permit communication between the spaces 17 and 18 and between the spaces 19 and 20 so as to allow the circulation of the heating medium from one of the chambers or spaces into the other.

The space 17 has a pipe coupling 24 communicating therewith to which a pipe 25 is connected. The space 19 has a pipe coupling 26 communicating therewith to which a pipe 27 is connected. The pipes 25 and 27 angle outwardly beyond the outer end of the hub 1 of the wheel and has communication with the interior of a distributer 28. The distributer 28 has an elbow 29 connected thereto, upon the inner end of which elbow is formed a ball 30 to provide a ball and socket connection between the distributer 28 and the elbow 29 to allow the wheel to be steered independently of movement of the elbow. The ball 30 is provided with an opening 31 which communicates with the interior of the separator. A separating or dividing point 32 is formed in the interior of the distributer 28 directly in alinement with the opening 31 and it divides the heating medium which enters the distributer so that a part of the heating medium will pass into the pipe 25 while the remainder thereof will pass into the pipe 27. The elbow 29 is connected to the distributer 28 by a substantially semi-spherical shell 33 which is attached to the distributer casing by bolts 34, The distributer casing is supported by suitable supporting arms 35 which are attached to certain of the spokes 3 of the wheel structure.

A pipe 36 is connected to the elbow 29 and to a second length of pipe 37 by a pipe elbow 38. The pipe 37 extends across above the wheel structure and is connected to a T joint 39. The exhaust pipe from the engine or motor of the tractor is connected to the T joint 39 and a second length of pipe 41 is also connected to the T joint 39 in alinement with the exhaust pipe 40. The ends of the exhaust pipe 40 and the pipe 41 are spaced and a pivoted valve 42 is mounted therein which is controlled by the operation of a lever 43 so that when it is desired to direct the heating medium through the pipes 37 and 36 into the distributer 28 and from there through the pipes 25 and 27 into the spaces of the wheel, the lever 43 is operated to cut off the communication between the interior of the T joint 39 and the pipe 41 while if it is desired to permit the heating medium to exhaust without passing through the wheel, the lever 43 is operated to assume the position indicated in dotted lines in Fig. 1 of the drawings which will prevent the heating medium from entering the pipe 37.

The chambers or spaces 18 and 20 have pipes 44 communicating therewith upon the inner free ends of which pipes are mounted elbows 45. The pipes 44 are provided to permit of the exhaust of the heating medium out of the chambers or spaces 18 and 20 and the elbows 45 direct the exhaust of the heating medium to prevent it exhausting directly against the top of the wheel.

The heating medium, after entering the distributer 28, through the opening 31 is divided by a divider 32 and the portion thereof which passes into the pipe 25 passes through this pipe and into the space or chamber 17, traveling substantially half way around the wheel or until it reaches the opening 22 which communicates between the passage ways or chambers 17 and 18, when it passes into the passage way 18 and returns through this passage way and exhausts out of the pipe 44 while the portion of the heating medium which enters the pipe 27 passes into the chamber 19, through this chamber and the opening 22 at the end of the same into the chamber 20, returns back through the chamber 20 and exhausts out of the exhaust pipe 44.

In reducing the invention to practice, certain minor features of construction, combination and arrangement of parts may necessitate alterations to which the patentee is entitled provided such alterations are comprehended within the scope of what is claimed.

What is claimed is:

1. In a tractor wheel structure, a rim provided with parallel passages extending substantially half way around the circumference of the wheel in each direction, openings formed at corresponding ends of said passage way to permit the passage of the heating medium from one chamber into the other chamber of each pair of chambers, and an exhaust pipe communicating with one chamber of each pair of chambers.

2. In a tractor wheel structure, a rim provided with chambers extending substantially half way around the wheel in both directions, inlet pipes communicating with said chambers, a distributer communicating with the inlet of said inlet pipe, for distributing the heating medium entering the same into the pipe communicating with the chambers.

3. In a tractor wheel structure, a rim provided with chambers extending substantially half way around the wheel in both directions, inlet pipes communicating with said chambers, a distributer communicating with the inlet of said inlet pipe, for distributing the heating medium entering the same into the pipe communicating with the chambers, return chambers formed in said wheel rim and arranged with relation to said first named chambers whereby a pair of chambers will extend parallel to each other about substantially one-half of the circumference of the wheel, and an exhaust pipe communicating with said return chambers.

4. In a tractor wheel structure, a rim provided with chambers extending substantially half way around the wheel in both directions, inlet pipes communicating with said chambers, a distributer communicating with the inlet of said inlet pipe, for distributing the heating medium entering the same into the pipe communicating with the chambers, return chambers formed in said wheel rim and arranged with relation to said first named chambers whereby a pair of chambers will extend parallel to each other about substantially one half of the circumference of the wheel, and an exhaust pipe communicating with said return chambers, a pipe elbow having a ball formed upon one end of the same, said ball swivelly connected to said distributer, said ball provided with an opening to permit the passage of a heating medium therefrom into said distributer, and a feed pipe communicating with said elbow.

In testimony whereof I affix my signature in presence of two witnesses.

JOHN H. WASHBURN.

Witnesses:
E. H. CUMMINGS,
JAMES A. PANTING.